United States Patent
Lin et al.

(10) Patent No.: US 12,151,763 B2
(45) Date of Patent: Nov. 26, 2024

(54) ELECTRIC VEHICLE ASSEMBLY

(71) Applicant: NATIONAL CHUNG-HSING UNIVERSITY, Taichung (TW)

(72) Inventors: Kuan-Jiuh Lin, Taichung (TW); Jun-Wei Su, Chiayi (TW)

(73) Assignee: NATIONAL CHUNG HSING UNIVERSITY, Taichung (TW)

( * ) Notice: Subject to any disclaimer, the term of this patent is extended or adjusted under 35 U.S.C. 154(b) by 289 days.

(21) Appl. No.: 17/659,236

(22) Filed: Apr. 14, 2022

(65) Prior Publication Data

US 2022/0332385 A1  Oct. 20, 2022

(30) Foreign Application Priority Data

Apr. 16, 2021  (TW) ................................ 110113693

(51) Int. Cl.
| | | |
|---|---|---|
| *B62J 45/20* | (2020.01) | |
| *B62J 3/14* | (2020.01) | |
| *B62J 45/411* | (2020.01) | |
| *B62M 6/50* | (2010.01) | |

(52) U.S. Cl.
CPC ................. *B62J 45/20* (2020.02); *B62J 3/14* (2020.02); *B62J 45/411* (2020.02); *B62M 6/50* (2013.01)

(58) Field of Classification Search
CPC . B62J 45/20; B62J 3/14; B62J 45/411; B62M 6/50
See application file for complete search history.

(56) References Cited

U.S. PATENT DOCUMENTS

| | | | | |
|---|---|---|---|---|
| 10,508,410 | B2* | 12/2019 | Hoshaku | E02F 3/437 |
| 2017/0371335 | A1* | 12/2017 | Xie | G05D 1/0066 |
| 2019/0300105 | A1* | 10/2019 | Marshall | B62J 45/412 |
| 2022/0063672 | A1* | 3/2022 | Corbett | B60W 60/0016 |
| 2023/0150608 | A1* | 5/2023 | Misgeld | B62M 6/60 |
| | | | | 180/206.1 |

FOREIGN PATENT DOCUMENTS

| | | | | |
|---|---|---|---|---|
| CN | 107301745 A | * | 10/2017 | ......... G01G 19/4144 |
| CN | 107331008 B | * | 9/2019 | ......... G07C 9/00174 |

(Continued)

OTHER PUBLICATIONS

English translation of CN-107331008-B (Year: 2019).*

(Continued)

*Primary Examiner* — Anshul Sood
*Assistant Examiner* — Matthew Ho
(74) *Attorney, Agent, or Firm* — Leong C. Lei

(57) ABSTRACT

An electric vehicle assembly includes an electric vehicle and a processing device. The electric vehicle includes a wheel, and an electric motor configured to drive the wheel to rotate and to output a value of torque force applied on the wheel and a speed measurement of the electric vehicle. The processing device stores a vehicle weight, and receives a value of torque force and two speed measurements of the electric vehicle from the electric motor, obtains an acceleration based on the speed measurements, obtains a current user weight based on the value of torque force, the acceleration and the vehicle weight, and outputs a notification when the current user weight is lower than an initial user weight by a predetermined ratio.

12 Claims, 2 Drawing Sheets

(56) References Cited

FOREIGN PATENT DOCUMENTS

| | | | | |
|---|---|---|---|---|
| CN | 110667594 A | * | 1/2020 | ............. B60R 16/02 |
| DE | 102012212526 A1 | * | 1/2014 | ........... B62J 45/4152 |
| JP | 2004025931 A | * | 1/2004 | ............ B60T 8/1706 |
| JP | 2010253978 A | * | 11/2010 | |
| JP | 2014128994 A | * | 7/2014 | |
| TW | 201725142 A | | 7/2017 | |
| TW | 201738141 A | | 11/2017 | |
| TW | 201743036 A | * | 12/2017 | ............ G01M 9/065 |
| TW | I701182 B | | 8/2020 | |
| WO | 2008023978 A1 | | 2/2008 | |
| WO | WO-2020155561 A1 | * | 8/2020 | ............. A63B 26/00 |

OTHER PUBLICATIONS

English translation of CN-110667594-A (Year: 2020).*
English translation of JP-2010253978-A (Year: 2010).*
English translation of TW-201743036-A (Year: 2017).*
English translation of DE-102012212526-A1 (Year: 2014).*
English translation of JP-2014128994-A (Year: 2014).*
English translation of JP-2004025931-A (Year: 2004).*
English translation of WO-2020155561-A1 (Year: 2020).*
English translation of CN-107301745-A (Year: 2017).*
Search Report appended to an Office Action, which was issued to Taiwanese counterpart application No. 110113693 by the TIPO on Feb. 15, 2022, with an English translation thereof.

* cited by examiner

ELECTRIC VEHICLE ASSEMBLY

CROSS-REFERENCE TO RELATED APPLICATION

This application claims priority to Taiwanese Invention Patent Application No. 110113693, filed on Apr. 16, 2021.

FIELD

The disclosure relates to an electric vehicle assembly, and more particularly to an electric vehicle assembly capable of outputting a notification to remind a user to drink water.

BACKGROUND

A danger coefficient, which is a sum of an outdoor temperature and a product of a relative humidity multiplied by 0.1, can be used to estimate likelihood of heat stroke. Generally, when the danger coefficient is smaller than 30, it should be safe to exercise outdoors; when the danger coefficient is between 30 and 35, one should pay attention to supplement for water during outdoor exercise; when the danger coefficient is between 35 and 40, supplement for water is much required and intense outdoor exercise should be avoided; when the danger coefficient exceeds 40, any outdoor exercise is advised against.

In order to avoid occurrence of heat stroke, it is recommended to drink 700 mL of water every two hours for normal exercise, or 1 L of water every hour for intense exercise. However, everyone's physiological condition is different, the aforementioned standard may be too much for some and too little for others.

For example, Taiwanese Patent Application Publication No. 201738141A provides a bicycle controller for controlling output of a motor of a bicycle in accordance with a riding condition of the bicycle.

SUMMARY

Therefore, an object of the disclosure is to provide an electric vehicle assembly that is capable of outputting a notification to remind a user to drink water and that can alleviate at least one of the drawbacks of the prior art.

According to one aspect of the disclosure, an electric vehicle assembly includes an electric vehicle and a processing device. The electric vehicle includes a wheel, and an electric motor configured to drive the wheel to rotate and to output a value of torque force applied on the wheel and a speed measurement of the electric vehicle.

The processing device includes an output unit, and a processing unit that stores a vehicle weight which is a weight of the electric vehicle, that is electrically connected to the electric motor and the output unit, and that is configured to implement a monitoring procedure.

The monitoring procedure includes receiving a value of torque force at a current time point from said electric motor, receiving from the electric motor two speed measurements of the electric vehicle measured respectively at the current time point and a previous time point which is a predetermined time interval earlier than the current time point, obtaining an acceleration based on the speed measurements and the predetermined time interval, obtaining a current user weight based on the value of torque force thus received, the acceleration and the vehicle weight, and controlling the output unit to output a notification when the current user weight is lower than an initial user weight by a predetermined ratio.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

Figure 1:
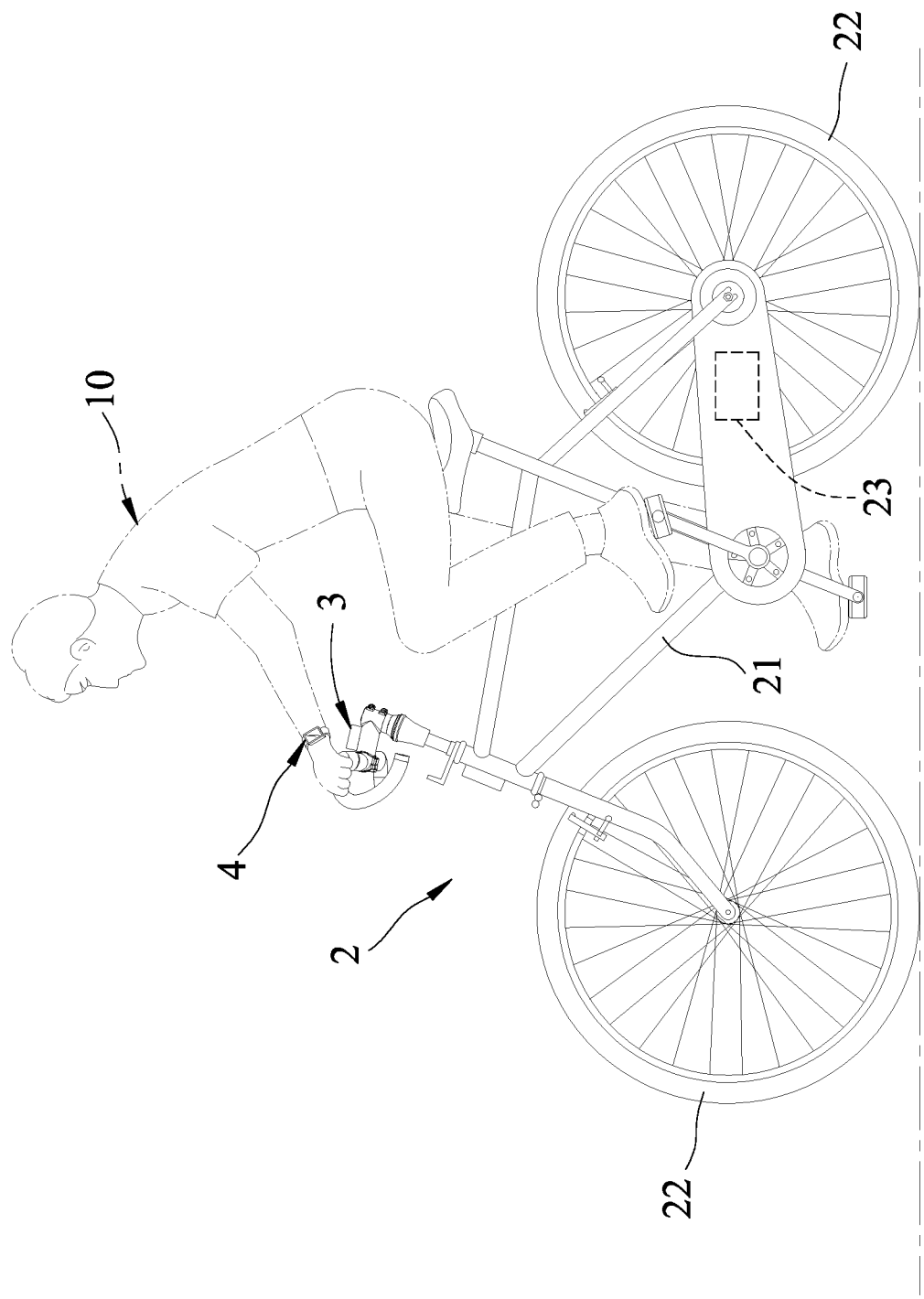
FIG. 1 is a schematic view of an electric vehicle assembly according to an embodiment of this disclosure.
Figure 2:
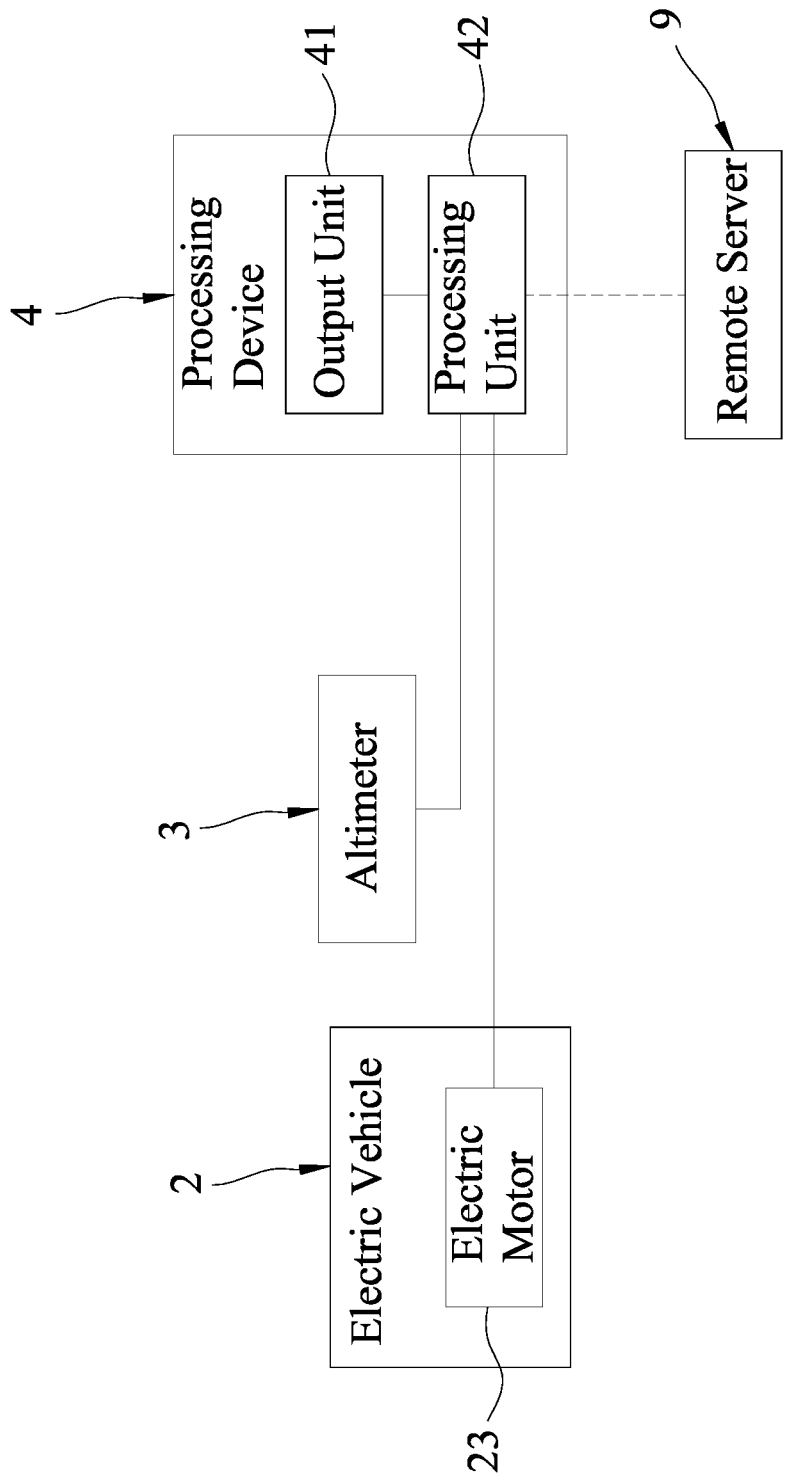
FIG. 2 is a block diagram of the electric vehicle assembly according to an embodiment of this disclosure.

Referring to FIGS. 1 and 2, an electric vehicle assembly capable of outputting a notification to remind a user 10 to drink water is provided according to an embodiment of this disclosure. The electric vehicle assembly includes an electric vehicle 2, an altimeter 3 and a processing device 4.

For example, the electric vehicle 2 is, but not limited to, an electric bicycle. In other embodiments, the electric vehicle 2 may be any type of electric vehicles capable of carrying a person (e.g., an electric wheelchair). In this embodiment, the electric vehicle 2 includes a vehicle frame 21, two wheels 22 rotatably attached to the vehicle frame 21, and an electric motor 23 mounted on the vehicle frame 21. The electric motor 23 is configured to apply a torque to drive one of the wheels 22 to rotate, and to output a value of torque thus applied thereon and a speed measurement of the electric vehicle 2. Since, for a general motor, detecting torque applied on the motor and obtaining a speed measurement based on a rotation speed of the motor are built-in functions of the motor, details thereof are omitted herein for the sake of brevity.

The altimeter 3 is configured to measure altitude and to output an altitude measurement. For example, the altimeter 3 may be embodied using a pressure altimeter, a sonic altimeter, a radar altimeter, a global position system receiver, etc.

The processing device 4 is, for example, a wearable device (e.g., a smart watch), a portable device (e.g., a smart phone), or the like. The processing device 4 includes an output unit 41, and a processing unit 42 electrically connected to the electric motor 23, the altimeter 3 and the output unit 41. The processing unit 42 stores a weight of the electric vehicle 2, hereinafter referred to as "vehicle weight". In some embodiments, the altimeter 3 and the processing device 4 may be integrated as a single device.

The processing unit 42 may be embodied using a central processing unit (CPU), a microprocessor, a microcontroller, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

The processing unit 42 is configured to periodically obtain a slope based on two altitude measurements that are measured by the altimeter 3 respectively at two different time points with a predetermined time interval therebetween and received from the altimeter 3, and an acceleration based on two speed measurements that are measured by the electric motor 23 respectively at the two different time points and received from the electric motor 23. The processing unit 42 is configured to implement an initial procedure and a monitoring procedure. Specifically, when the processing device 4 is activated, the processing unit 42 is configured to implement the initial procedure first by default.

In the initial procedure, when the electric motor 23 starts at a start-up time point and outputs a value of torque (hereinafter referred to as "start-up torque value"), the processing unit 42 receives the start-up torque value from the electric motor 23 at the start-up time point. Further, the processing unit 42 receives, from the electric motor 23, two speed measurements of the electric vehicle 2 measured respectively at the start-up time point and a previous time point which is the predetermined time interval earlier than the start-up time point (hereinafter referred to as "start-up speed measurements"). Then, the processing unit 42 obtains a start-up acceleration based on the start-up speed measurements and the predetermined time interval, and obtains an initial user weight based on the start-up torque value, the start-up acceleration and the vehicle weight. In some embodiments, the processing unit 42 is configured to calculate the initial user weight by itself; specifically, the initial user weight is a result of subtracting the vehicle weight from a quotient of a force induced by the start-up torque value divided by the start-up acceleration. In other embodiments, the processing device 4 further includes a communication unit (not shown), and the processing unit 42 is configured to communicate with a remote server 9 via the communication unit to transmit the start-up torque value, the start-up speed measurements and the vehicle weight to the remote server 9 in order for the remote server 9 to calculate the initial user weight, and to receive the initial user weight from the remote server 9.

For example, the communication unit may include a short-range wireless communication module supporting a short-range wireless communication network using a wireless technology of Bluetooth® and/or Wi-Fi, etc., a mobile communication module supporting telecommunication using Long-Term Evolution (LTE), the third generation (3G) and/or fifth generation (5G) of wireless mobile telecommunications technology, and/or the like.

In some embodiments, the initial user weight may be inputted by the user 10 operating a user interface (not shown) of the processing device 4, and thus the processing unit 42 does not need to implement the initial procedure.

While implementing the initial procedure, the processing unit 42 further receives two altitude measurements measured respectively at two separate time points from the altimeter 3, obtains a slope based on the two altitude measurements, and implements the monitoring procedure when an absolute value of the slope is not greater than a predetermined value. For example, the predetermined value is one. The predetermined value may be more than one according to actual usage conditions and demands.

In the monitoring procedure, the processing unit 42 receives, from the electric motor 23, a value of torque at a current time point (hereinafter referred to as "current torque value"), and two speed measurements of the electric vehicle 2 respectively measured at the current time point and a previous time point which is the predetermined time interval earlier than the current time point (hereinafter referred to as "current speed measurements"). Then, the processing unit 42 obtains a current acceleration based on the current speed measurements and the predetermined time interval, and obtains a current user weight based on the current torque value, the current acceleration and the vehicle weight. In some embodiments, the processing unit 42 is configured to calculate the current user weight by itself; specifically, the current user weight is a result of subtracting the vehicle weight from a quotient of a force induced by the current torque value divided by the current acceleration. In other embodiments, the processing unit 42 is configured to transmit the current torque value, the current speed measurements and the vehicle weight to the remote server 9 in order for the remote server 9 to calculate the current user weight, and to receive the current user weight from the remote server 9. Once the current user weight is lower than the initial user weight by a first predetermined ratio, the processing unit 41 controls the output unit 41 to output a first notification to remind the user 10 to drink water. Further, once the current user weight is lower than the initial user weight by a second predetermined ratio that is greater than the first predetermined ratio, the processing unit 41 controls the output unit 41 to output a second notification to remind the user 10 to drink water. For example, the first predetermined ratio is 1% and the second ratio is 2%. It should be noted that the processing unit 42 may iterate the monitoring procedure in order to continuously estimate the weight of the user 10 and to timely remind the user 10 to drink water. In some embodiments, the processing unit 42 is further configured to, when the current user weight is greater than the initial user weight, use the current user weight to replace the initial user weight for a subsequent iteration of the monitoring procedure.

In some embodiments, the output unit 41 may include an audio device (e.g., a buzzer, a speaker, or the like), a vibrator, and/or a display device (e.g., a liquid crystal display, light-emitting diode display, or the like). The audio device of the output unit 41 is configured to output different sounds as the first and second notifications, respectively. The vibrator of the output unit 41 is configured to produce different vibrations as the first and second notifications, respectively. The display device of the output unit 41 is configured to display different messages as the first and second notifications, respectively.

The following describes an exemplary use of the electric vehicle assembly.

Generally, the electric vehicle 2 is usually parked on a flat surface, for example, having a slope between −1 degree and 1 degree, and the processing unit 42 is configured to implement the initial procedure at this time by default. When the electric motor 23 starts to drive the electric vehicle 2 to move, the processing unit 42 calculates a total weight of the electric vehicle 2 and the user 10 based on the start-up torque value and the start-up acceleration. Specifically, according to principles of mechanics, Newton's second law describes that a force acting on an object is equal to a product of an acceleration of the object multiplied by a mass of the object. Accordingly, the total weight of the electric vehicle 2 and the user 10 can be calculated as the quotient of a force induced by the start-up torque value divided by the start-up acceleration. Then, the weight of the user 10 (i.e., the initial user weight) can be calculated by subtracting the vehicle weight of the electric vehicle 2 from the total weight.

During movement of the electric vehicle 2, the processing unit 42 determines whether the absolute value of the slope obtained in the initial procedure is not greater than one (i.e., whether the slope is between −1 degree and 1 degree), and implements the monitoring procedure when the determination is affirmative. In some embodiments, the processing unit 42 may determine whether the slope is between −5 degrees and 5 degrees (i.e., the predetermined value is 5), or any other value as deemed appropriate.

When the current user weight is lower than the initial user weight by 1% (the first predetermined ratio), it means that the user 10 has lost 1% of his/her weight (i.e., 1% of water in his/her body) and the output unit 41 would output the first notification to remind the user 10 to drink water. Further, when the current user weight is lower than the initial user weight by 2% (the second predetermined ratio), it means that the user 10 has lost 2% of his/her weight (i.e., 2% of water in his/her body) and the output unit 41 would output the second notification to remind the user 10 to drink water. Although the above-mentioned example only provides two criteria for outputting a notification (i.e., the first and second predetermined ratios), the processing device 4 may be configured to output a notification according to more than two criteria in other embodiments.

In a case that the user 10 is carrying an additional object (e.g., bought something during the ride), an overall weight of the user 10 will be increased. Accordingly, the current user weight estimated in the monitoring procedure will be increased and be greater than the initial user weight. In order to make an accurate determination, when the current user weight is greater than the initial user weight, the processing unit 42 uses the current user weight to replace the initial user weight for a subsequent iteration of the monitoring procedure.

In summary, the processing unit 42 is capable of estimating the current user weight based on the value of torque and the speed measurements of the electric vehicle 2 provided by the electric motor 23, and controls the output unit 41 to output a notification to remind the user 10 to drink water when the current user weight is lower than the initial user weight by the predetermined ratio. The processing device 4 is thus able to achieve the effect of timely reminding the user 10 to drink water, and thus the probability of the user 10 suffering from a heat stroke can be reduced.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An electric vehicle assembly, comprising:
   an electric vehicle including a wheel, and an electric motor configured to drive said wheel to rotate, and to output a value of torque applied on said wheel and a speed measurement of said electric vehicle; and
   a processing device including an output unit, and a processing unit that stores a vehicle weight which is a weight of said electric vehicle, that is electrically connected to said electric motor and said output unit, and that is configured to implement a monitoring procedure including
   receiving a first value of torque force at a current time point from said electric motor,
   receiving from said electric motor two first speed measurements of said electric vehicle respectively measured at the current time point and a previous time point, the previous time point being a predetermined time interval earlier than the current time point,
   obtaining a first acceleration based on the first speed measurements and the predetermined time interval,
   obtaining a current user weight based on the first value of torque thus received, the first acceleration and the vehicle weight, and
   controlling said output unit to output a first notification when the current user weight is lower than an initial user weight by a first predetermined ratio,
   wherein said processing unit is further configured, before implementing the monitoring procedure, to receive two altitude measurements respectively measured at two separate time points from said altimeter, and obtain a slope based on the two altitude measurements; and
   wherein said processing unit is further configured to implement an initial procedure before implementing the monitoring procedure, and the initial procedure includes:
   once the electric motor starts, receiving a second value of torque from said electric motor at a start-up time point which is a time when said electric motor started;
   receiving from said electric motor two second speed measurements of said electric vehicle respectively measured at the start-up time point and a previous time point which is a time point the predetermined time interval earlier than the start-up time point;
   obtaining a second acceleration based on the second speed measurements and the predetermined time interval; and
   obtaining the initial user weight based on the second value of torque, the second acceleration and the vehicle weight; and
   wherein said processing device switches from the initial procedure to the monitoring procedure when the slope is within a predetermined range, wherein the predetermined range is between −1 degree and 1 degree.

2. The electric vehicle assembly of claim 1, wherein said processing unit is configured to calculate the current user weight by itself.

3. The electric vehicle assembly of claim 2, wherein said processing unit is configured to obtain a result of subtracting the vehicle weight from a quotient of a force induced by the first value of torque divided by the first acceleration to serve as the current user weight.

4. The electric vehicle assembly of claim 1, wherein said processing unit is configured to communicate with a remote server to transmit the first value of torque, the first speed measurements and the vehicle weight to the remote server in order for the remote server to calculate the current user weight, and to receive the current user weight from the remote server.

5. The electric vehicle assembly of claim 1, wherein said processing unit is configured to calculate the initial user weight by itself.

6. The electric vehicle assembly of claim 5, wherein said processing unit is configured to obtain a result of subtracting the vehicle weight from a quotient of a force induced by the second value of torque divided by the second acceleration to serve as the initial user weight.

7. The electric vehicle assembly of claim 1, wherein said processing unit is configured to communicate with a remote server to transmit the second value of torque, the second speed measurements and the vehicle weight to the remote server in order for the remote server to calculate the initial user weight, and to receive the initial user weight from the remote server.

8. The electric vehicle assembly of claim 1, wherein said processing unit is further configured to, when the current user weight is greater than the initial user weight, use the current user weight to replace the initial user weight for a subsequent iteration of the monitoring procedure.

9. The electric vehicle assembly of claim 1, wherein the monitoring procedure further includes controlling said output unit to output a second notification when the current user weight is lower than the initial user weight by a second predetermined ratio that is greater than the first predetermined ratio.

10. The electric vehicle assembly of claim 9, wherein said output unit is configured to output different sounds as the first and second notifications, respectively.

11. The electric vehicle assembly of claim 9, wherein said output unit is configured to produce different vibrations as the first and second notifications, respectively.

12. The electric vehicle assembly of claim 9, wherein said output unit is configured to display different messages as the first and second notifications, respectively.

* * * * *